United States Patent [19]
Birrell

[11] 3,938,639
[45] Feb. 17, 1976

[54] PORTABLE DISPENSER FOR MIXED BEVERAGES

[75] Inventor: Peter Leslie Birrell, Delta, Canada

[73] Assignee: The Cornelius Company, Minneapolis, Minn.

[22] Filed: Nov. 28, 1973

[21] Appl. No.: 419,872

[52] U.S. Cl. .......... 194/87; 194/DIG. 4; 222/129.4; 222/294
[51] Int. Cl.² ........................................ G07F 13/00
[58] Field of Search ............ 222/129.3, 129.4, 294; 194/85, 87, 88, 90, 91, DIG. 4, DIG. 12

[56] References Cited
UNITED STATES PATENTS

| | | | |
|---|---|---|---|
| 1,441,438 | 1/1923 | Leonhardt | 194/85 |
| 2,239,966 | 4/1941 | Johnson | 222/294 X |
| 2,365,165 | 12/1944 | Bauman et al. | 194/85 |
| 2,832,510 | 4/1958 | Hill | 222/129.4 |
| 2,954,145 | 9/1960 | McCauley | 222/129.4 |
| 3,790,029 | 2/1974 | Ward | 222/129.4 |

Primary Examiner—Robert B. Reeves
Assistant Examiner—Francis J. Bartuska
Attorney, Agent, or Firm—Hill, Gross, Simpson, Van Santen, Steadman, Chiara & Simpson

[57] ABSTRACT

A portable dispenser unit includes a stand on a base and having a liquid reservoir on top communicating with a nozzle located under a dispensing head therebelow controlled by a normally closed valve device. The head is receptive of a supply of flowable particulate material from a container equipped with a closure providing a combination adapter for coupling the container in supplying relation with the head, a seal to assure product freshness, a device for modulating material flow from the container into the head, and a device for preventing trademarked product substitution. Particulate material metering rotor in the head, and said valve device are selectively operable through a manual device which may be optionally coupled continuously with the metering rotor or releasably coin coupled with the metering rotor. To provide hot beverage, an electrical heater is carried by the reservoir.

19 Claims, 11 Drawing Figures

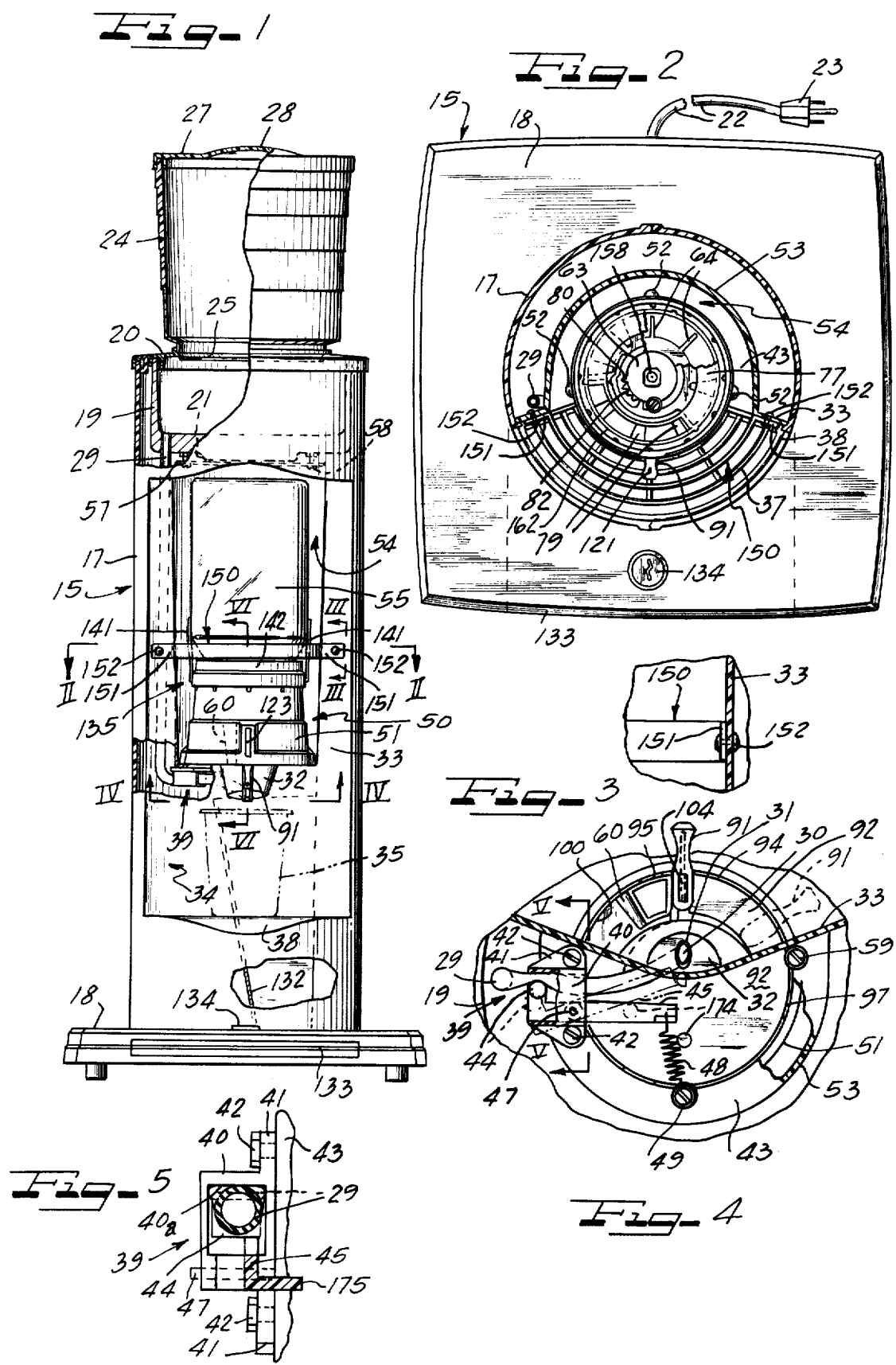

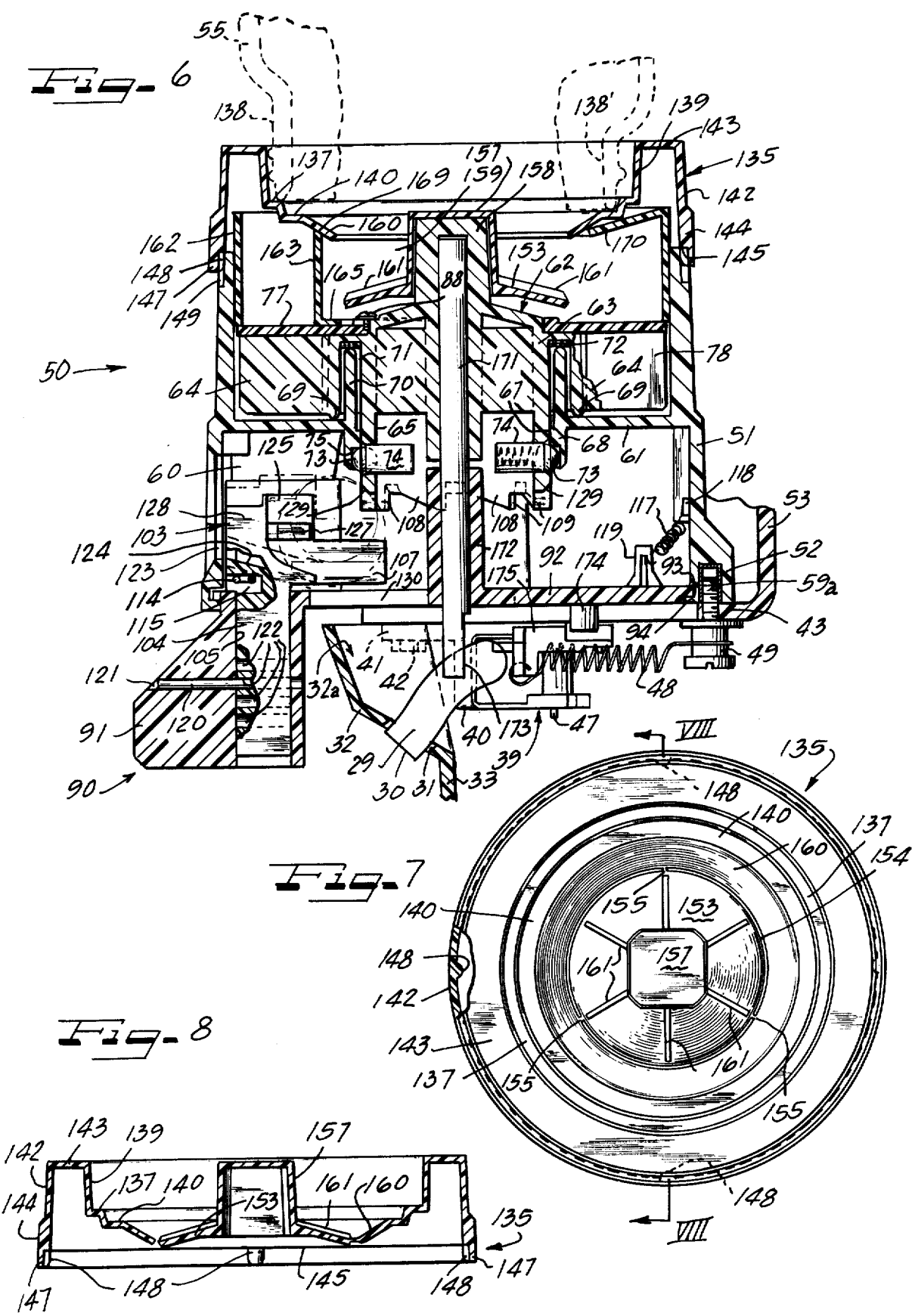

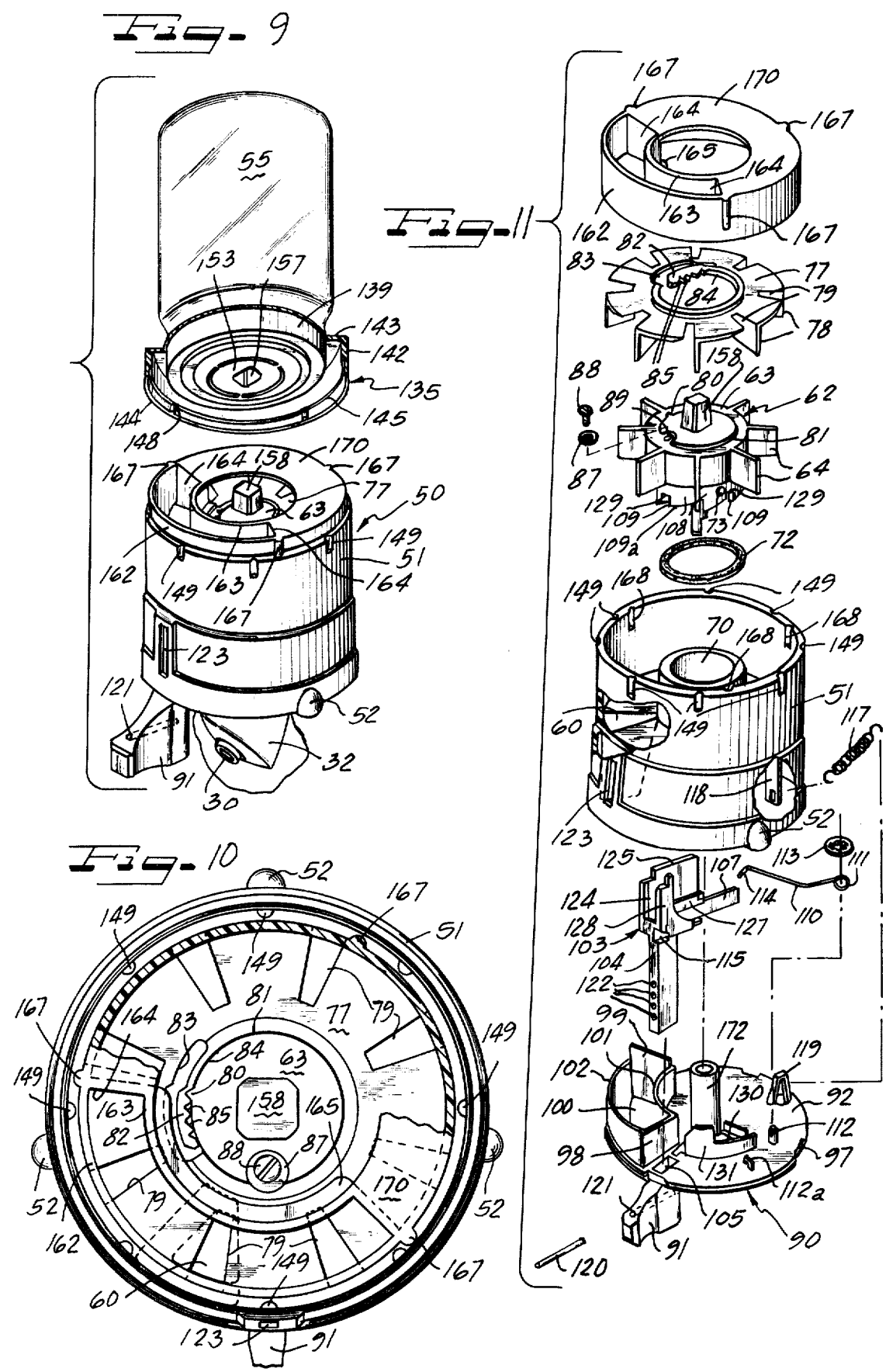

PORTABLE DISPENSER FOR MIXED BEVERAGES

This invention relates to a new and improved portable dispenser and method of dispensing, and is more particularly concerned with such a dispenser and method for combining liquid and flowable particulate material as a beverage.

Several problems have existed in prior beverage dispensers such as for freeze-dried, or so called instant, coffee, tea, chocolate or soup. For a liquid, i.e., water, source, prior dispensers have customarily required connection with a water supply line. Little or no assurance of genuineness of trademarked products from the manufacturers or suppliers to the ultimate consumer has been provided for. Product deterioration in the dispenser has been a problem. Liquid control valving has presented problems of complexity and rapid deterioration and unreliability. Coin controlled operating mechanisms have generally been complex in structure and difficult or impossible to adjust for variable pricing, coin size differences in various localities, or for optional non-coin, i.e., free, operation.

It is, accordingly, an important object of the present invention to overcome the foregoing and other disadvantages, deficiencies, inefficiencies, shortcomings, and problems in prior structures and methods in this art and to attain important advantages and improvements in portable dispensers and methods of operating the same.

Another object of the invention is to provide a new and improved portable beverage vending dispenser and method of operating the same.

A further object of the invention is to provide a new and improved dispenser having novel means for preventing trademarked product substitution.

Still another object of the invention is to provide a new and improved method of and means for combining liquid and particulate material from a dispenser in selective quantities.

Yet another object of the invention is to provide a new and improved dispensing head structure for flowable particulate materials.

A still further object of the invention is to provide new and improved dispenser operating mechanism which is easily and variably adjustable for free or coin controlled operation.

Other objects, features and advantages of the invention will be readily apparent from the following description of a preferred embodiment thereof, taken in conjunction with the accompanying drawings although variations and modifications may be effected without departing from the spirit and scope of the novel concepts embodied in the disclosure, and in which:

FIG. 1 is a front elevational view of a portable dispenser embodying features of the invention and with certain parts broken away for illustrative purposes;

FIG. 2 is an enlarged sectional plan view taken substantially along the line II—II of FIG. 1;

FIG. 3 is a fragmentary vertical sectional detail view taken substantially along the line III—III of FIG. 1;

FIG. 4 is an enlarged fragmentary sectional plan view taken substantially along the line IV—IV of FIG. 1;

FIG. 5 is an enlarged sectional detail view taken substantially along the line V—V of FIG. 4;

FIG. 6 is an enlarged fragmentary vertical sectional detail view taken substantially along the line VI—VI of FIG. 1;

FIG. 7 is a top plan view of a combination supply container seal, seating member and flow control device employed with the dispenser;

FIG. 8 is a diametrical sectional view taken substantially along the line VIII—VIII of FIG. 7;

FIG. 9 is an illustrative exploded view showing the dispensing head and a supply container with the sealing, seating, flow controlling member applied thereto ready for application to the head;

FIG. 10 is a top plan view of the dispensing head, with one part partially broken away for illustrative purposes; and FIG. 11 is an exploded perspective view showing the elements of the dispensing head.

As depicted in FIG. 1, a dispenser 15 according to the present invention comprises a stand 17 preferably in the form of a vertically extending tubular shell (FIG. 2) which may be molded from suitable rigid plastic material. At the lower end the stand 17 is provided with a stable base 18. On its upper end, the stand 17 has a liquid reservoir 19 desirably in the form of a pan-like container suitably secured to the shell of the stand 17 as for example to a cover 20 over the top of the hollow stand 17. In this instance the reservoir 19 is preferably formed from a heat exchange material such as aluminum and carries, cast in its bottom an electrical resistance heater 21 adapted to be supplied with electrical energy through an extension cord 22 having a suitable plug 23 for connecting it into an electrical energy source such as a house current outlet. Increased capacity for the reservoir 19 is provided by an upward tank extension 24 having an open bottom and communicating with the reservoir 19 through an opening 25 in the top 20. To permit easy filling of the reservoir, the extension 24 has a removable cover 27 provided with a central handle 28. Through this arrangement, liquid such as water in fairly large volume can be filled into the reservoir 19, including the tank extension 24, and heated to a desirable temperature such as suitable for hot beverages, e.g. coffee, tea and soup.

From the bottom of the reservoir 19 liquid is conducted by means of a downwardly extending duct or conduit 29 to a discharge orifice 30 at its lower end projecting out of a clearance opening 31 in a generally downwardly facing dispensing nozzle boss 32 provided on a supporting wall member 33 (FIGS. 1 and 3) bent inwardly along a vertical axis and defining a dispensing niche 34 recessed in the front of the tubular housing defining the stand 17. Desirably, the lower end of the niche 34 as defined by the front portion of the wall of the stand 17 extends to a limited distance above the base 18 and the boss 32 is located at a sufficient height above the lower end of the niche 34 to conveniently receive a receptacle 35 in a position under the discharge orifice 30 to receive a charge of liquid thereinto. For convience in locating the receptacle, a receptacle support in the form of a grid 37 (FIG. 2) is removably supported in a spill tray 38 removably mounted in the bottom of the niche 34.

Means in the form of a control valve 39 are provided for normally shutting off flow through the duct 29, which at least in its slower end discharge nozzle portion is of a resiliently flexible material preferably of a suitable plastic which is resistent to deterioration within the heat range of the liquid such as hot water to be dispensed. To this end, the valve structure 39 comprises a body member 40 which may comprise a rigid plastic molding having a generally U-shaped configuration providing a preferably rectangular yoke recessed of a width substantially equal to the outside diameter of the tubing of the duct 29 (FIG. 5). On one side the yoke body 40 has oppositely extending attachment flanges 41 by which it is attached as by means of screws 42 (FIG. 4) to the underside of a horizontal supporting flange 43 provided by the lower end of the niche wall 33. The position of the yoke body 40 is such that the nozzle portion of the duct 29 extends therethrough upstream from the discharge orifice 30. Normal pinch-off pressure is applied to the portion of the tube 29 which extends through the body yoke 40, by a valve presser 44 thrusting toward a back up bight surface 40a within the body 40 to pinch the tube closed against gravitational flow of liquid therethrough. Thrusting force is applied to the valve presser 44 through an integral lever 45. The presser 43 is on one end of the lever arm 45 which is intermediately pivotally secured as by means of a pin 47 between the open end portions of the body yoke, a coiled tension spring 48 being connected to the opposite end of the lever 45 and to the platform flange 43 by means of an anchoring stud 49 (FIGS. 4 and 6).

Means comprising a dispensing head 50 are provided within the niche 34 for dispensing metered quantities of fluent discrete material such as granular or powdered freeze-dried or otherwise processed soluble beverage material comprising coffee, tea, soup, or the like, into the receptacle 35 selectively and concurrently but desirably sequentially with depositing of a charge of hot water from the orifice 30 into the receptacle 35. As a major component, the head 50 has a generally hollow tubular vertically extending body 51 having about its base perimeter portion a plurality such as three spaced radially enlarged attachment bosses 52 (FIGS. 2 and 6) which rest upon the supporting platform flange 43 which is in the form of a ledge of generally semicircular form at the lower end of a suitably larger radius subindentation portion 53 in the niche-defining wall 33 providing a sub-niche 54 within the niche 34 and dimensioned to receive the head 50 and a particulate material supply container 55 on the head in concentric relation within the stand 17. At its upper end, the sub-niche indentation wall portion 53 is desirably provided with an overlying roof flange panel 57 providing a support for the reservoir member 19 which may be secured thereto by suitable fasteners such as screws 58. Attachment of the body 51 to the ledge platform 43 is effected by means of fasteners comprising screws 59, one of which may be in the form of a screw extension 59a from the spring anchoring stud 49 (FIG. 6).

Means are provided within the body 51 for selectively metering suitable quantities of flowable particulate material into a chute or funnel 60 integral with and opening downwardly from a material supporting floor 61 formed integrally within the body 51 at an intermediate height therein. The metering means include a generally paddle wheel shaped rotor 62 (FIGS. 6 and 11) having a hub 63 provided with a set of radially extending equidistantly spaced paddle vanes 64. Mounting of the metering member 62 on the floor 61 with the vanes 64 subdividing an annular area contiguous to the wall of the body 51 is effected by engaging a downwardly projecting flange extension 65 on the hub 63 through a central bearing aperture 67 in the floor panel 61 defined by a downwardly extending annular bearing flange 68 which is shorter than the hub flange 65. Thereby the hub 63 is maintained concentric within the housing provided by the head 51 and the vanes 64 are maintained with their outer ends in fairly close but free moving clearance relation to the body 51. To avoid drag of the lower edges of the vanes 64 on the floor panel 61, they are provided with respective small spacer bearing nibs 69 adjacent the radially inner ends of the lower edges. To prevent radially inward spilling of material from the supporting floor 61, the floor panel is provided with an annular upwardly extending curb flange 70 about the central opening 67 and received in an annular downwardly opening clearance groove 71 in the hub 63, with sealing means comprising a felt washer 72 engaged between the upper edge of the flange 70 and the root of the groove 71. For step-by-step indexing of the product metering pockets between the vanes 64 with the funnel 60, torque releasable detent means are provided comprising a pair of oppositely directed spring biased detent balls 73 supported in respective cartridges 74 mounted in the depending hub flange 65 and torque-releasably engagable in properly located detent recesses 75 in the inner diameter of the encompassing flange 68. Thereby the metering rotor 62 can be accurately rotatably advanced step-by-step for advancing metered quantities of product for discharge from the dispensing head 50 through the funnel 60, the opening into which is dimensioned substantially the same as the space between vanes.

For different products, the metered quantities to be dispensed will vary to provide a desirable beverage strength, and for this purpose shutter means are provided in the form of a generally flat ring 77 which is dimensioned to overlie and be carried by the rotor 63 and more particularly the vanes 64 and has a set of depending modulating vanes 78 equal in number to and complementary in shape to the vanes 64 and projecting downwardly therebetween. Along one side of each of the modulating vanes 78 the ring has a product supply slot 79 so that product placed on the ring 77 can drop down between the vanes 78. Thereby, each of the companion vanes 64 and 78 with which one of the slots 79 is aligned will define therebetween a metering space which can be varied by relatively rotating the ring 77 and the rotor 63 to vary the spacing between the vanes, and thus the pocket volumes.

Various modulating settings of the gauging ring 77 are adapted to be determined by indexing means including a detent and rachet mechanism comprising a radial detent projection 80 on an annular hub crown shoulder 81 inset from the outer diameter of the hub 63 and about which the inner diameter of the ring 77 engages in the assembly. Retainingly engagable with the detent projection 80 is a multitoothed ratchet arm 82 located in a recess 83 in the inner diameter of the ring 77 and connected at one end to the ring through a resilient biasing connection 84 so as to make firm indexing engagement with the detent 80 in any respective selected one of a pluralilty of inner edge detent recesses 85. Through this arrangement, the gauging ring 77 can be turned to move its vanes 78 toward or away from the companion metering rotor vanes 64 to adjust the metered quantities of product to be dispensed, and the desired indexed adjustment will be maintained by the indexing detent and ratchet mechanism. After the desired setting has been indexed, or some intermediate setting has been decided upon, the ring 77 can be locked against inadvertent misadjustment by means of a clamping washer 87 retained by a screw 88 secured into a suitably tapped hole 89 in the crown of the hub 63 inwardly adjacent to the shoulder 81 so as to clampingly secure the adjacent inner margin of the ring 77 tightly against the hub.

For actuating the metering rotor 62 a preferably manual operating device 90 is provided constructed and arranged to effect step-by-step rotary advance of the rotor selectively. To this end, the device 90 includes a wing-like handle 91 projecting downwardly and forwardly from the lower end of the body 51 and integral with a bottom closure disk 92 freely rotatably received at its margin within a dowarwardly and inwardly opening rabbet groove 93 in the lower edge of the body 51. To retain the disk 92 in assembly with the body, the disk is provided in the lower face of its margin with a downwardly and outwardly opening rabbet groove 94 within which are engaged thin and narrow retainer lugs 95 (FIG. 3) formed integrally with the lower edge of the body 51 and received during assembly through respective notches 97 (FIG. 11) in the disk 92. Thus, by having the retaining lugs equally spaced with respect to the notches 97, but at circumferential points offset relative to the normal rotary operating position of the disk 92, after assembly of the disk with the body has been effected and the disk turned to its operating position, assurance is provided of retention of the disk 92 in assembly with the body 51 but permitting free operating relative rotary movement of the disk. Limitation of rotary movement of the disk 92 to a one metering pocket range is provided for by utilizing the funnel 60 as a fixed stop with which limiting stop means on the disk 92 are engagable. For this purpose, the disk 92 has an upwardly extending stop flange 98 adjacent to the left side of the handle 91, and spaced a proper distance therefrom a second upstanding stop flange 99, between which stop flanges the funnel 60 is received, a clearance opening 100 being provided in the disk 92 between the stops 98 and 99 to permit discharge from the funnel. Reinforcement for the stop flanges 98 and 99 is provided by integral connecting reinforcing flanges 101 and 102 at the radially inner and outer sides of the opening 100.

Optional coin coupling or free coupling means are provided between the operating disk 92 and the metering rotor 62, herein including a convertible coupler 103 (FIGS. 6 and 11) carried by the disk 92 in association with the handle 91. Connection of the coupler 103 with the handle 91 is effected by means of a depending coupler stem 104 of rectangular cross section fitting slidably in a vertical socket 105 of complementary shape and opening upwardly through the handle. To effect direct coupling of the coupler 103 with the rotor 62, an inwardly projecting coupling arm 107 integral with the upper end of the stem 104 is of a length to underlie and effect selective engagement with an annular series of spaced ratchet teeth 108 on the lower end of the rotor flange 65 and each presenting a coupling shoulder 109 facing in clockwise direction when viewed from the top and having respective leadin cam edges 109a extending obliquely in counterclockwise direction to the upper ends of the next adjacent tooth shoulders 109. By biasing the coupler 103 upwardly, as by means of a tension spring 110, the coupling arm 107 will engage with the respective coupling tooth shoulders 109. The spring 110 desirably comprises a spring arm having a loop 111 at one end secured about an upwardly extending stud 112 on the disk 92 and secured in place as by means of a grip nut 113. From the stud 112 the spring extends through a perforated orientation lug 113, and has on its distal end a biasing finger 114 which engages in a notch 115 in the coupler 103.

To implement proper coupling of the operating disk 92 with the rotor 62 for each incremental metering advance, the disk 92 is normally biased in clockwise direction as viewed from above by means comprising a tension spring 117 anchored at one end to a fixed eye rib 118 on the inner wall of the body 51 and anchored at its opposite end to an upstanding eye lug 119 on the disk 92. Thereby the disk 92 is normally biased to thrust the stop shoulder flange 98 against the adjacent side of the funnel 60. Further, the detents 73 are properly oriented to so index the rotor 62 that each of the series of ratchet tooth shoulders 109 will successively align with the coupling arm 107. Then, by applying rotary force to the operator 90 through the handle 91 in a counterclockwise direction, the coupling arm 107 will advance the rotor 62 by one metering pocket, and the detents 73 will click into another setting provided by the detent recesses 75. After a metering advance of the rotor 62 has been effected and the handle 91 is released the spring 117 promptly returns the operating disk 92 to the starting position, and the resilient bias of the spring 110 permits the coupling arm 107 to yield along the lead in cam edge 109a of the next succeeding coupling tooth 108 until the arm 107 snaps into coupling relation to the shoulder 109 thereof.

For selective coin coupling, the coupler 103 is anchored in depressed position by means of a pin 120 which is lodged in a front to rear bore 121 in the handle 91 and engaged through a selected one of a plurality of vertically spaced matching bores 122 in the coupler stem 104, depending upon the size of coin to be used. Then, to effect coupling with the rotor 62, the proper selected size coin is inserted through a vertical slot 123 in the front wall of the housing body 51 with which a vertical wall coin chute 124 provided in the upper portion of the coupler 103 registers in the starting position of the operating disk 92. On insertion of the selected coin, it rolls down the downwardly and inwardly inclined bottom wall of the chute 124 between a vertical backup flange 125 at the left side of the chute and a resilient retaining finger 127 extending inwardly from a cutback right side wall 128 defining the chute, with the vertically disposed coin engaging at its upper inner edge within a locating slot 129 at the base of the aligned ratchet tooth shoulder 109. Then, with the coin completing the coupling between the coupler 103 and the rotor flange 65, turning of the disk 92 by manipulation of the handle 91 in clockwise direction will cause the rotor 62 to be rotatably advanced by one metering pocket increment, the shoulder flange 99 stopping the operating stroke at the limit of its range. Upon release of the handle 91 the spring 117 snaps the operating disk 92 in return direction, and the cam surface 109a of the next succeeding tooth 108 tips the coupling coin past the resilient finger 127 to drop down through a clearance opening 130 in the disk 92 and about which there is an upstanding coin guard flange 131. Below the disk 92, the dropped coin descends through a partial funnel-like deflection passage 32a provided by the boss 32 and thence through a discharge chute 132 (FIG. 1) into a coin tray 133 (FIGS. 1 and 2) slidably mounted in the base 118 and which may be provided with a key controlled lock 134.

A non-reusable diaphram-like closure 135 (FIGS. 6–9) is provided with each of the filled product supply containers 55 to provide a combination adapter for coupling the container in supplying relation to the head 50, to provide means for reasonable assurance of genuineness of the trademarked product, to provide a seal to protect the product supply against deterioration in the dispenser, and to provide a device for modulating material flow from the container 55 into the head 50. For this purpose, the closure 135 is constructed in the form of a cap which may be supplied as a factory mounted part of the container, but may also, as shown, be provided as a member to be applied to the container 55 after a customary sealing closure has been removed from the container. Conveniently and economically, the closure 135 may be molded from suitable, plastic material such as styrene and provides a generally cup-shaped structure having a body disk 137 of a diameter to be engaged against maximum diameter container neck 138 and provided with a centering rim flange 139 within which the neck 138 is received. For centered engagement with smaller diameter container neck 138', the body 137 is provided with a stepped area 140. Thereby a standard overall size of the closure 135 will fit several diameters of container neck. To facilitate holding the closure cap 135 on the container neck 138 while the container is being manipulated from an upright position into an inverted position and assembled in supplying relation with the dispensing head 50, adhesive tapes 141 may be applied to secure a reversely directed outer perimeter rim flange 142 to the container (as best seen in FIG. 1). Connection of the rim flanges 139 and 142 is through an integral annular connecting and reinforcing flange 143.

Mounting the container with the closure 135 thereon into supplying position over the dispensing head 50 comprises centering the outer perimeter rim flange 142 in seating relation on the upper end of the body 51. For this purpose, the flange 142 has a thickened annular seating marginal portion 144 provided with an internal recessed seating shoulder 145 which engages upon the upper end of the body 51 with an annular centering flange 147 engaging about such upper end fairly closely so that a reasonably good contact sealing relation is maintained between the cap rim and the body edge. In addition, anti-turn lugs 148 extend from the seat 145 and the flange 147 at circumferentially spaced intervals and engage in complementary recess sockets 149 in the encompassed rim portion of the body 51, thereby holding the cap 135 keyed against turning relative to the body 51 after the cap has been fully applied to the dispensing head 50.

To prevent mounting of the container 55 on the dispensing head 50 without the closure 135 applied thereto, security means are provided in the form of a guard bar 150 of outwardly bowed form extending across the niche recess 54 at about the elevation assumed by the reinforcing flange 143 of the closure cap 135 sealed on the dispensing head 50. Attachment of each end of the bar 150 to the wall 33 is desirably effected by means of an integral laterally extending attachment arm extensions 151 on the bar secured as by means of rivets 152 to the wall 33. The clearance between the security bar 150 and the dispensing head 50 is such that the container 55 fitted with closure cap 135 may be readily inverted into position for dispensing. The security bar 150 is so positioned, however, as to defeat the unauthorized removal of the container 55 before it is empty without loss of its contents, or the mounting of the container 55 when it is full without loss of its contents unless the closure cap 135 is properly applied thereto.

Construction of the diaphram-like closure cap 135 is such that it has a relatively movable body part 153 which can provide a dispensing capability through the closure after the closure with the accompanying product filled container 55 has been mounted on the dispenser housing body 51. For this purpose, the body portion 153 comprises a central circular part of the body 137 partially separated therefrom along a circular rupture line 154, with attachment to the remainder of the body 137 being at small rupturable integral connections 155 at circumferentially spaced intervals such as three points. These connections are sufficient to hold the body portion 53 against the pressure of contents of the container 55, inasmuch as the portion 153 is only part of the area of the closure body 140 so that a substantial portion of the contents are supported by the remainder of the body 140 outside of the rupture line 154.

Means are carried by the dispensing head 50 for rupturing the body portion 153 and supporting it movably to enable a modulated annular flow of the contents material from the container 55 through the closure 135 about the body portion 153. For this purpose, the central area of the body portion 153 of the closure cap is provided with a hollow embossment 157 which extends in the same direction as the rim wall 139 and has a noncircular, in this instance multiangular cross section to receive in freely slidable keyed relation therein a complementary boss 158 rising centrally from the hub 63 of the metering rotor 62. The height of the rotor boss 158 is sufficient to require reception of the crown portion of the rotor boss in the mouth end of the chamber opening from the closure boss 157 when the closure member 135 is seated on the housing body 51. The angular cross section of the bosses 157 and 158 is properly oriented relative to the antirotation interlock lugs 148 and sockets 149 to permit full registration of the bosses 157 and 158 and seating of the closure 135 on the housing body 51 without rupturing the connections 155 of the seal closure member 135. However, at the beginning of the first metering rotational movement of the rotor 62 following mounting of the container 55, the connections 155 are ruptured by turning of the boss 158 and thereby turning of the boss 157 and the closure body portion 153 relative to the remainder of the body portion 140 which is held nonrotatable by the connection effected through the lugs 148 in the sockets 149. Promptly upon such rupture, the container contents pressing down on the crown of the boss 157 and on the closure body portion 153 pushes the separated body portion 153 down fully on the boss 158 and opens an annular discharge orifice 159 (FIG. 6) between the portion 153 and the central opening of the body 140 left by removal of portion 153. Flow of contents from the container 55 toward the severed portion 153 is facilitated by frustoconical funnel-like formation of a lip annular portion 160 about the opening. Modulation of flow by the portion 153 is facilitated by its frustoconical form sloping away from the boss 157, and is further aided by the provision of the sloping surface of a plurality, such as six equally radiating ribs 161.

Cooperating with the flowable particulate material modulating closure 135 and its separated flow modulating portion 153 and the underlying metering rotor 62 is a funnel guard and material distribution controlling member in the form of a ring 162 which is dimensioned to be slidably received within the upper portion of the housing body 51 and is readily removable for cleaning purposes. As best seen in FIGS. 6 and 9-11, the funnel guard ring 162 is constructed to act upon the top of the volume control shutter 77 to prevent material supply from the container finding a direct path to the funnel 60 but permits free access of the material to the metering pockets of the rotor 62 which in any given rotary position of the rotor are spaced from the funnel 60. To this end, the ring 162 is of such a vertical length that with its lower end resting upon the outer margin of the disk body of the shutter 77 the ring extends to a sufficient height above the upper edge of the housing body 51 to have the upper edge of the ring 162 adequately above the material supply delivery lip 160 of the closure 135 to avoid escape of material impelled theretoward by the modulating disk body 153 in operation of the dispensing head 50. To prevent access of the material to the shutter slots 79 associated with the metering pockets which in any rotary position of the rotor 62 are aligned with or adjacent to the funnel 60, the ring 162 is provided with an integral shorter radius semicylindrical barrier wall portion 163 which has radially extending vertical partition flanges 164 connecting its opposite ends with the ring 162. At its lower edge, the guard wall 163 engages slidably with the shutter disk 77 along the inner ends of the slots 79 and is provided with a reinforcing and sealing radial inwardly directed foot flange 165 which will substantially prevent creeping of material under the barrier wall 163. It will thus be seen that the barrier wall 163 together with the partitions 164 defines with the associated portion of the ring 162 a dead space which in this instance as best seen in FIG. 10 is of a length to prevent access of supplied flowable particulate material to at least the slot 79 over the meterin pocket which is in registration with the funnel 60. For optimum control, the dead space provided by the barrier wall 163 is of an area to include also the two adjacent metering pockets.

Means are provided for properly indexing the ring 162 in assembly and also for holding it against rotary displacement. For this purpose a plurality, such as three vertically extending and radially projecting indexing rib lugs 167 are provided on the outer perimeter of the ring 162. Complementary sockets 168 are provided in the inner perimeter of the upper margin of the body 51 within which the lugs 167 are received. By having the lugs 167 and the sockets 168 assymetrically spaced, proper indexing is assured in assembly.

In addition to its funnel guard function, the ring 162 serves as means for maintaining freshness of product by contributing to air sealing of the product supply chamber within the dispensing head 50. For this purpose, the upper edge of the barrier wall 163 is located to be engaged by the confronting surface of the ramp lip 160 of the closure 135 and is desirably provided with a complementary chamber sealing contact surface 169. This sealing contact surface is carried continuously throughout 360° on a downwardly and inwardly sloping semcircular guard flange 170 extending integrally from the upper edge of the ring 162 with an inside diameter the same as the barrier wall 163 and integrally connected at its ends to the tops of the partitions 164. Not only does the overhanging flange 170 cooperate with the upper edge of the wall 163 in sealing engagement with the lip 160, but it also provides a guard against spilling of material over the top of the ring 162.

Although the construction and relationship of parts is such that the operating disk member 92 is operable concentrically within the housing body 51 and relative to the metering rotor 62 when uncoupled, and jointly therewith when coupled thereto, an improved stabilized concentricity is provided by the provision of a common shaft 171 on the axis of the operating disk and the rotor. This shaft 171 is fixed in concentrically keyed relation within the rotor hub 63 and projects downwardly therefrom and is slidably received through an upwardly projecting integral hub tubular bearing 172 on the disk 92. A free relatively rotatable relationship between the hub bearing 172 and the shaft 171 permits uncoupled free relative turning of the disk 92 about the shaft. A keying extension 173 on the lower end portion of the shaft 171 provides for adaptation of the dispensing head 50 for motorized operation if desired.

Although joint rotation of the operating device 90 and the metering rotor 62 is effected only when they are coupled either in a continuous manner or by selective coin coupling, as may be preferred, the arrangement disclosed provides for opening the fluid control valve 39 for the nozzle portion of the duct 29 in each cyclical actuation of the operating device 90. For this purpose, the bottom of the disk 92 is provided with trip means in the form of a depending valve actuating rigid lug 174 (FIGS. 4 and 6) which is located in proper lost motion relation to a lateral flange 175 on the long arm portion of the valve lever 45 to engage and displace it pivotally in valve opening direction in opposition to the biasing spring 48 as the disk 92 approaches limit of operating stroke range as may be best seen by comparison of the full line and dash line positions in FIG. 4. By holding the operating disk 92 in the dispensing stroke position wherein the valve 39 is open, any desired quantity of liquid may be discharged from the nozzle orifice 30 into the receptacle 35. Thereby, a person may receive as much or as little of the liquid, such as hot water, in the receptacle 35, which may be a paper cup, china cup, glass or the like, as desired by that person for the particular beverage purposes preferred. Release of the lug 174 from the lever flange 175 results in automatic closing of the valve 39 by action of the biasing spring 48.

It may be noted that the surfaces of the valve body yoke 40 between which the presser 44 operates are in continuous engagement with the flexible nozzle portion of the hose of the duct 29, squeezed closed by the presser 44. This biases the squeezed portion to assume full open condition when released and protects the squeezed portion against taking a fatigue set.

Where the operating device 90 is continuously coupled with the metering rotor 62, each actuation of the operating device 90 will provide a metered charge of the flowable particulate material from the material supply just as the valve 39 is opened. In this setup, a multiple charge of the particulate flowable product may be received in the receptacle 35 for increased strength of beverage if the operating device 90 is repeatedly moved in the dispensing direction and is permitted to retract to starting position before being again actuated in the dispensing direction, whereafter the balance of the liquid may be dispensed by holding open of the valve 39 to mix with the material in the receptacle to complete the desired beverage.

If the dispensing head 50 is adjusted for coin operation, plain liquid such as hot water may be dispensed freely at any time, but when a charge of the flowable particulate material product is desired, a suitable coin inserted through the slot 123 will provide the desired beverage mix by actuation of the metering rotor 62 when the operating device 90 is actuated.

From the foregoing it will be apparent that the various objects of the present invention will be effectively attained by means of the apparatus described by way of example herein. It will be understood, of course, that variations and modifications may be effected without departing from the spirit and scope of the novel concepts of this invention.

I claim as my invention:

1. A dispenser for dispensing into a receptacle, comprising:
    a stand having a base and an upper portion;
    means providing a gravity feed liquid reservoir on said upper portion of said stand;
    a dispensing head carried by said stand below said reservoir and above said base for supporting a supply of flowable particulate material and having metering means rotatable about a vertical axis for gravitational dispensing of metered quantities of the material into the receptacle located therebelow;
    a duct leading from said reservoir to an outlet adjacent to said metering means to enable gravitational discharge of liquid into the receptacle concurrently with said dispensing of material;
    a valve normally closing said duct; and
    a selectively movable rotary opening device mounted to rotate about said axis below said metering means and having means effective in a single rotary operating movement of the device about said axis to mechanically drive and to actuate both said metering means and said valve, for dispensing particulate material and liquid into the receptacle.

2. A dispenser according to claim 1, including a funnel located eccentrically relative to said axis and opening downwardly from said head adjacent to said outlet, and means for indexing the rotary position of said metering means relative to said funnel.

3. A dispenser according to claim 1, including a funnel located eccentrically relative to said axis and into which the metering means discharges metered material, said metering means including a rotary member, and stop means on said member cooperating with said funnel to limit rotary movement of the member.

4. A dispenser according claim 1, wherein said metering means comprise a multi-pocketed rotor, means defining a material discharge opening from said head, and detent means for step-by-step indexing of the rotor pockets with said discharge opening.

5. A dispenser according to claim 4, including means carried by the rotor for gauging the volume of material received in the rotor pockets.

6. A dispenser according to claim 1, wherein said valve includes an operating lever, and means carried by said rotary operating device for actuating said lever.

7. A dispenser according to claim 6, wherein said valve comprises elements between which a flexible portion of said duct is normally pinched closed, one of said elements being carried by said lever, means normally biasing said lever to drive said one element into duct pinching relation to another of the valve members, and said means carried by the rotary operating device comprising a lever actuating lug which engages with the lever to displace it for moving said one member to valve opened position during rotary operating movement of the device.

8. A dispenser according to claim 1, wherein said valve comprises an assembly including relatively movable surfaces for pinching a flexible portion of the duct upstream from the outlet closed until actuated by said rotary operating device to open the valve, and surfaces adjacent to said relatively movable surfaces for substantially normalizing the flexible portion of the duct for efficient flow in the open condition of the valve.

9. A dispenser according to claim 1, wherein said rotary operating device comprises a disk member having an actuating handle, and a spring normally biasing said disk member in nonoperating direction and adapted to be overcome by manipulation of the handle to rotate the disk about said axis in metering means and valve actuating direction.

10. A dispenser comprising:
    dispensing means for supporting a supply of flowable material to be dispensed and having a rotary metering member for selectively dispensing metered quantities of the material;
    a manually movable rotary operating member mounted coaxially under said metering member and adapted for normally free rotary movement relative to said metering member;
    said operating member having a coupler receptive of and having means to support in upright relation a coin inserted thereinto;
    retaining means on said coupler for normally holding the coin upright on the coupler;
    an annular series of circumferentially spaced coupling shoulders on said metering member facing in one rotary direction and selectively engageable with a coin supported by said coupler whereby movement of the operating member in the opposite rotary direction effects metering rotation of said metering member in such opposite rotary direction;
    means for normally biasing said operating member in said one rotary direction; and
    coin discharge means on said metering member between said shoulders operative to displace a coupling coin from said coupler and said retaining means when said operating member returns in said one rotary direction after a dispensing operation thereof.

11. A dispenser according to claim 10, including a source of liquid having a discharge orifice for discharging into a receptacle in which dispensed material is received below said dispensing means, valve means for controlling flow from said discharge orifice, and means on said operating device and said valve means for opening the valve means in movement of the operating device in said opposite rotary direction.

12. A dispenser comprising:
    dispensing means for supporting a supply of flowable material to be dispensed and having movable metering means for selectively dispensing metered quantities of the material;
    a manually movable operating device mounted on the dispenser adjacent to said dispensing means and adapted for normally free movement relative to the dispensing means;
    means on said operating device and on said metering means for receiving and engaging a coin vertically on edge releasably therebetween as a coupling so that manual movement of the operating device effects material dispensing movement of the metering means; and a coupler carried by said operating device provided with means engageable with the lower edge of the coin, said means being adapted to be optionally set in effective height for either coin coupling operation of said operating device and metering means of direct coupled operation without an intervening coupling coin.

13. A dispenser comprising:

dispensing means for supporting a supply of flowable material to be dispensed, and having movable metering means for selectively dispensing metered quantities of the material;

a manually movable operating device mounted on the dispenser adjacent to said dispensing means and adapted for normally free movement relative to the dispensing means;

means on said operating device and on said metering means for receiving and engaging a coin vertically on edge releasably therebetween as a coupling so that manual movement of the operating device effects material dispensing movement of the metering means; and means for vertically adjusting the effective height of said coin receiving and engaging means to receive coins of a selected size for operating the dispenser.

14. A dispenser comprising:

dispensing means for supporting a supply of flowable material to be dispensed, and having movable metering means for selectively dispensing metered quantities of the material;

a manually movable operating device mounted on the dispenser adjacent to said dispensing means and adapted for normally free movement relative to the dispensing means;

means on said operating device and on said metering means for receiving and engaging a coin vertically on edge releasably therebetween as a coupling so that manual movement of the operating device effects material dispensing movement of the metering means;

said means for receiving and engaging a coin vertically on edge comprising a support under a lower edge portion of the coin and spaced elements supporting the sides of the coin;

said side supporting means providing thrust surface at one side of the coin and a releasable holding device at the opposite side of the coin; and means on said metering means for ejecting a coin past said releasable holding means after completion of a dispensing movement of the dispensing means.

15. A dispenser according to claim 14, including means for vertically adjusting said coin receiving and engaging means for selectively supporting coupling coins of different sizes.

16. A dispenser according to claim 14, including means for optionally releasing said coin receiving and engaging means for direct non-coin coupling engagement with said metering means, and means for biasing the coin receiving and engaging means into the non-coin coupling engagement with the metering means.

17. A dispenser for dispensing into a receptacle, comprising:

a stand having a base and an upper portion;

means providing a gravity feed liquid reservoir on said upper portion of said stand;

a dispensing head carried by said stand below said reservoir and above said base for supporting a supply of flowable particulate material and having metering means for gravitational dispensing of metered quantities of the material into the receptacle;

a duct leading from said reservoir to an outlet adjacent to said metering means to enable gravitational discharge of liquid into the receptacle concurrently with said dispensing of material;

a valve normally closing said duct;

a selectively movable rotary operating device having means effective in a single rotary operating movement of the device to actuate both said metering means and said valve, for dispensing particulate material and liquid into the receptacle;

said metering means comprising a rotor having a hub provided with an annular upwardly facing shoulder and including a set of radially extending vanes defining metering pockets;

an annular modulator adjustably mounted on said rotor shoulder and including means for modulating the volume of the pockets defined between the vanes; and means for releasably securing the modulator to said shoulder.

18. A dispenser for dispensing into a receptacle, comprising:

a stand having a base and an upper portion;

means providing a gravity feed liquid reservoir on said upper portion of said stand;

a dispensing head carried by said stand below said stand below said reservoir and above said base for supporting a supply of flowable particulate material and having metering means for gravitational dispensing of metered quantities for the material into the receptacle;

a duct leading from said reservoir to an outlet adjacent to said metering means to enable gravitational discharge of liquid into the receptacle concurrently with said dispensing of material;

a valve normally closing said duct;

a selectively movable rotary operating device having means effective in a single rotary operating movement of the device to actuate both said metering means and said valve, for dispensing particulate material and liquid into the receptacle;

said rotary operating device comprising a disk member having an actuating handle;

a spring normally biasing said disk member in nonoperating direction and adapted to be overcome by manipulation of the handle to rotate the disk in metering means and control valve actuating direction;

a vertical coin slot opening between said disk member and said metering means; and said means for actuating the metering means comprising means on said disk member and on said metering means for receiving a coin inserted through said slot in coupling relation.

19. A dispenser according to claim 18, wherein said means for actuating the valve remain operative even when the rotary operating device is rotated in the absence of a coupling coin.

* * * * *